C. BISHOP.
Cultivator.
No. 9,314.  Patented Oct. 12, 1852.
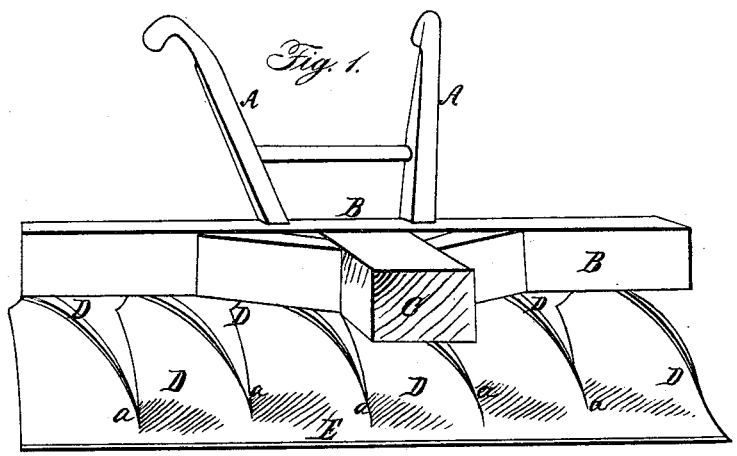
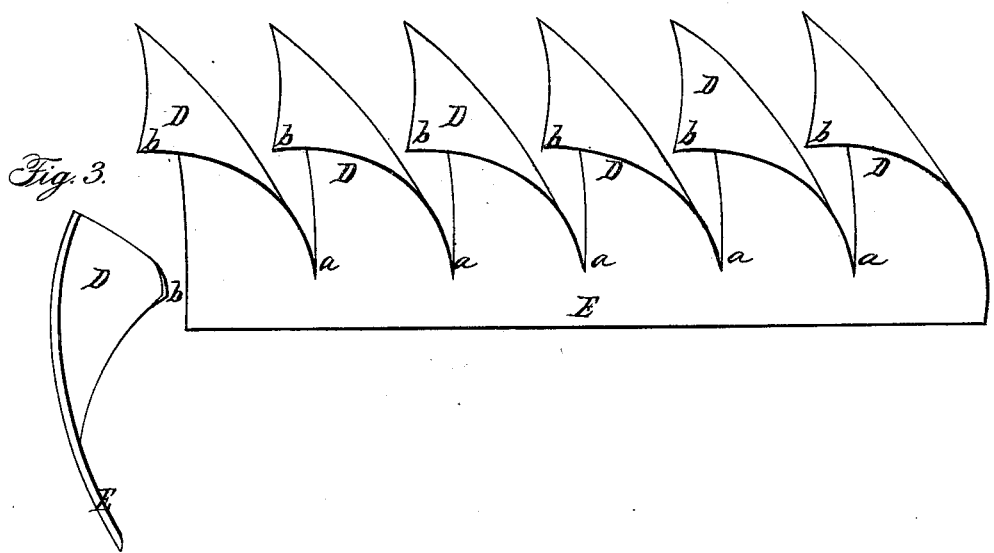

UNITED STATES PATENT OFFICE.

CHARLES BISHOP, OF NORWALK, OHIO.

IMPROVEMENT IN GANG-PLOWS.

Specification forming part of Letters Patent No. 9,314, dated October 12, 1852.

*To all whom it may concern:*

Be it known that I, CHARLES BISHOP, of Norwalk, in the county of Huron and State of Ohio, have invented a new and useful Improvement in Cultivators; and I do hereby declare that the following is a full, clear, and exact description of the construction and operation of the same, reference being had to the accompanying drawings, forming part of this specification, in which—

Figure 1 is a perspective view of a cultivator frame having my improved mold-boards and blade attached. Fig. 2 is a plan or bird's eye view of the mold-boards and blade detached from the frame. Fig. 3 is a diagram showing the form or shape of the mold-boards and blade.

Similar letters of reference indicate corresponding parts in each of the several figures.

My invention relates to a novel manner of constructing, combining, and arranging the mold-boards of cultivators; and it consists in cutting any desired number of straight slits, of equal length and at equal distances apart, nearly across the whole width of any suitable sheets of flexible metal, to form mold-boards for cultivators, and after cutting the sheet, as above described, bending up the parts thus cut, either to the right or left, into the form or shape of mold-boards of plows, and then attaching the turned or bent up ends to the frame of the cultivator. By thus turning or bending up the parts thus cut out into mold-boards a blade is formed of the whole length or width of the whole number of mold-boards which are combined and used in one cultivator. This blade is designed to answer the purpose of the common cultivator-point, and also serves to connect or combine any number of right and left mold-boards that may be desired to be used in one cultivator, in the most simple and effective manner.

The principal advantages obtained by thus constructing and combining a number of mold-boards in one cultivator is that of cheapness of construction and lightness and the effectual performance of the work intended to be accomplished by the same.

To enable others to make my improved mold boards, I will now proceed to describe their construction.

A represents the handles, and B the cross-bar or frame, to which the beam C, handles A, and mold-boards are attached.

D D D D D D represent the mold-boards, which are formed by taking a sheet of flexible metal suitable for the mold-boards of plows and cutting any desired number of slits *a a a a a* in it, and then bending up the parts thus cut or laid out into the shape of mold-boards, or in the manner represented in the drawings, Fig. 2, and more clearly by the diagram Fig. 3; and, after forming the mold-boards, attaching the turned-up ends *b b b b b b* to the cross-bar B, in the manner represented.

E indicates the blade, which forms part of and is made or cast with the mold-boards. This blade is formed by cutting and bending the sheet of metal in the manner above described, and is made to connect and combine any desired number of mold-boards together in one cultivator, in the manner represented in the drawings, Figs. 1 and 2, and also serves the purpose of the common cultivator-points—viz., that of preparing and cutting up the ground or soil for the action of the mold-boards.

When six or eight or any other number of mold-boards are combined in one cultivator I sometimes turn four or more of the mold-boards to the right and the others to the left, thereby making a right and left cultivator or mold-board.

Having thus fully described the nature of my invention, I will now state what I claim as new, and desire to secure by Letters Patent—

The manner herein described of constructing the mold-boards D D D D D D and combining them with the blade E, in the manner substantially as herein specified.

CHARLES BISHOP.

Witnesses:
   A. G. SUTTON,
   JOHN SMITH.